US008085437B2

(12) United States Patent
Ohkubo

(10) Patent No.: US 8,085,437 B2
(45) Date of Patent: Dec. 27, 2011

(54) IMAGE FORMING APPARATUS AND IMAGE FORMING METHOD

(75) Inventor: Hiroki Ohkubo, Yokohama (JP)

(73) Assignee: Ricoh Company Limited, Tokyo (JP)

( * ) Notice: Subject to any disclaimer, the term of this patent is extended or adjusted under 35 U.S.C. 154(b) by 683 days.

(21) Appl. No.: 12/058,013

(22) Filed: Mar. 28, 2008

(65) Prior Publication Data

US 2008/0240611 A1 Oct. 2, 2008

(30) Foreign Application Priority Data

Mar. 29, 2007 (JP) ................................. 2007-088784
Mar. 24, 2008 (JP) ................................. 2008-075924

(51) Int. Cl.
*G06K 9/20* (2006.01)

(52) U.S. Cl. ....................................... 358/3.01; 358/1.9

(58) Field of Classification Search ................. 358/3.01; 382/283
See application file for complete search history.

(56) References Cited

U.S. PATENT DOCUMENTS 4,698,778 A * 10/1987 Ito et al. ........................ 345/667
6,177,948 B1 * 1/2001 Estabrooks et al. .......... 347/129
6,731,407 B1 * 5/2004 Hayama .......................... 358/3.2
6,771,391 B1 * 8/2004 Konishi et al. ................. 358/1.9
6,791,714 B1 * 9/2004 Ishimura ........................ 358/1.9
6,888,558 B2 * 5/2005 Pierson .......................... 347/240
7,433,513 B2 * 10/2008 Li ................................. 382/167

FOREIGN PATENT DOCUMENTS

JP 8-297746 11/1996
JP 2006-74305 3/2006

* cited by examiner

*Primary Examiner* — King Poon
*Assistant Examiner* — Allen H Nguyen
(74) *Attorney, Agent, or Firm* — Oblon, Spivak, McClelland, Maier & Neustadt, L.L.P.

(57) ABSTRACT

An image forming apparatus includes an expansion unit to expand image data to first matrix data including a plurality of rows and columns, a first mask unit to mask the first matrix data by performing a logical operation on the first matrix data and a mask pattern, a second mask unit to select any one of first processing to thoroughly mask a unit area of the first matrix data and second processing to mask a unit area of the first matrix data by using the first mask unit, with respect to each mask unit area by using third matrix data including a plurality of mask unit areas that is formed of the same number of rows and columns as the mask pattern, and an image formation unit to form an image by modulating the first matrix data that is masked by the second mask unit into an optical writing signal.

12 Claims, 9 Drawing Sheets

FIG. 9

MASK PATTERN SETTING

| ADDRESS (h) | REGISTER NAME | D15 D14 D13 D12 D11 D10 D9 D8 D7 D6 D5 D4 D3 D2 D1 D0 | CONTENTS | R/W | DEFAULT VALUE |
|---|---|---|---|---|---|
| 0100 | MASKEN0 | — MASKEN0[3:0] | MASK SELECTOR MS FOR IMAGE DATA 0 | R/W | 0h |
| 0101 | MASK0 | MASK0[15:0] | MASK PATTERN MP FOR IMAGE DATA 0 | R/W | 0000h |
| 0102 | MASKEN1 | — MASKEN1[3:0] | MASK SELECTOR MS FOR IMAGE DATA 1 | R/W | 0h |
| 0103 | MASK1 | MASK1[15:0] | MASK PATTERN MP FOR IMAGE DATA 1 | R/W | 0000h |
| 0104 | MASKEN2 | — MASKEN2[3:0] | MASK SELECTOR MS FOR IMAGE DATA 2 | R/W | 0h |
| 0105 | MASK2 | MASK2[15:0] | MASK PATTERN MP FOR IMAGE DATA 2 | R/W | 0000h |
| 0106 | MASKEN3 | — MASKEN3[3:0] | MASK SELECTOR MS FOR IMAGE DATA 3 | R/W | 0h |
| 0107 | MASK3 | MASK3[15:0] | MASK PATTERN MP FOR IMAGE DATA 3 | R/W | 0000h |

| REGISTER NAME | BIT NAME | FUNCTION DESCRIPTION | REMARKS | DEFAULT VALUE |
|---|---|---|---|---|
| MASKEN X | MASKEN X [3:0] | (see diagram MS) | 8 LINES OF SUB-SCANNING × 8 PIXELS OF MAIN SCANNING [0]: MSs [1]: MSm | 0h |
| MASK X | MASK X [15:0] | (see diagram MP) | 4 LINES OF SUB-SCANNING × 4 PIXELS OF MAIN SCANNING [0]: MPt [1]: MPm | 0000h |

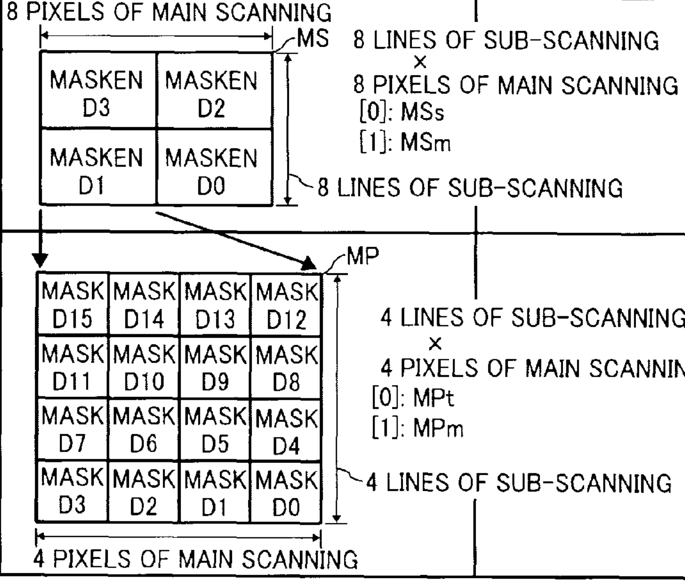

IMAGE FORMING APPARATUS AND IMAGE FORMING METHOD

CROSS-REFERENCE TO RELATED APPLICATION

The present patent application claims priority under 35 U.S.C. §119 from Japanese Patent Application No. 2007-088784, filed on Mar. 29, 2007, and No. 2008-075924, filed on Mar. 24, 2008 in the Japan Patent Office, the entire contents of each of which are hereby incorporated by reference herein.

BACKGROUND OF THE INVENTION

1. Field of the Invention

Preferred embodiments of the present invention generally relate to an image masking technique, and more particularly, to an image forming apparatus and an image forming method for efficiently masking image data using a unit formed of small-scale circuitry while maintaining image quality and reducing toner consumption.

2. Discussion of the Related Art

In general, in order to reduce toner consumption in image formation, a mask processing unit to mask image data is employed in an image forming apparatus. A conventional mask processing unit masks entire image data at one time or applies a large mask pattern to image data. As a result, several problems have arisen in that circuitry employed for masking is likely to increase in size, and image quality of a masked image deteriorates in comparison with an original image even if toner consumption is reduced by masking image data.

Several techniques have been proposed for masking image data efficiently. For example, a technique involving extracting several picture elements (pixels) in a predetermined relation between a pixel of interest and peripheral pixels from image data and using the extracted pixels for smoothing image data is conventionally known. In the technique, the several pixels are efficiently extracted from the image data by performing a logical operation on the image data in units of pixel matrices including a plurality of pixel arrays.

Alternatively, a technique for converting multivalic image data into small image data including less information than the multivalic image data by using characteristics of a density conversion curve is known. In the technique, a decrease in the number of graduations due to data conversion can be avoided, and a high quality image can be obtained.

However, the above-described techniques have a drawback in that several problems due to image processing still remain. According to the above-described techniques, an image forming apparatus is required to include large-scale circuitry. Furthermore, although toner consumption is reduced, original image quality is not maintained.

SUMMARY OF THE INVENTION

The present invention describes a novel image forming apparatus, which, in one preferred embodiment, includes an expansion unit to expand image data input to the image forming apparatus to first matrix data formed of a plurality of rows and columns, a first mask unit to mask the first matrix data by performing a logical operation on the first matrix data and a mask pattern, wherein second matrix data formed of a plurality of rows and columns functions as the mask pattern, and wherein the number of rows and columns of the second matrix data is smaller than the number of rows and columns of the first matrix data, a second mask unit, which is formed of third matrix data including a plurality of mask unit areas that is formed of the same number of rows and columns as the second matrix data, to select any one of first processing to thoroughly mask a unit area of the first matrix data corresponding to one of the mask unit areas of the third matrix data and second processing to mask a unit area of the first matrix data corresponding to one of the mask unit areas of the third matrix data by using the first mask unit, with respect to each of the mask unit areas by using the third matrix data, and an image formation unit to form an image by modulating the first matrix data that is masked by the second mask unit into an optical writing signal, wherein the third matrix data in which any one of the first processing or the second processing selected by the second mask unit is assigned to each of the mask unit areas successively moves an entire area of the first matrix data in units of the third matrix data to mask the first matrix data.

The present invention further describes a novel image forming method, which, in one preferred embodiment, includes the steps of expanding image data input to an image forming apparatus to first matrix data formed of a plurality of rows and columns, masking the first matrix data by performing a logical operation on the first matrix data and second matrix data that is formed of a plurality of rows and columns, wherein the number of rows and columns of the second matrix data is smaller than the number of rows and columns of the first matrix data, masking a unit area of the first matrix data corresponding to a mask unit area thoroughly, wherein the mask unit area is formed of the same number of rows and columns as the second matrix data, selecting any one of the step of masking a unit area of the first matrix data corresponding to the mask unit area thoroughly and the step of masking a unit area of the first matrix data corresponding to the mask unit area by using the second matrix data, with respect to each mask unit area by using third matrix data that includes a plurality of mask unit areas, and forming an image by modulating the first matrix data that is masked by the third matrix data into an optical writing signal, wherein the third matrix data is successively applied to an entire area of the first matrix data in units of the third matrix data to mask the first matrix data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 is a table showing an example format of the mask pattern MP and the mask selector MS in each color.

DETAILED DESCRIPTION OF THE PREFERRED EMBODIMENTS

Figure 1:
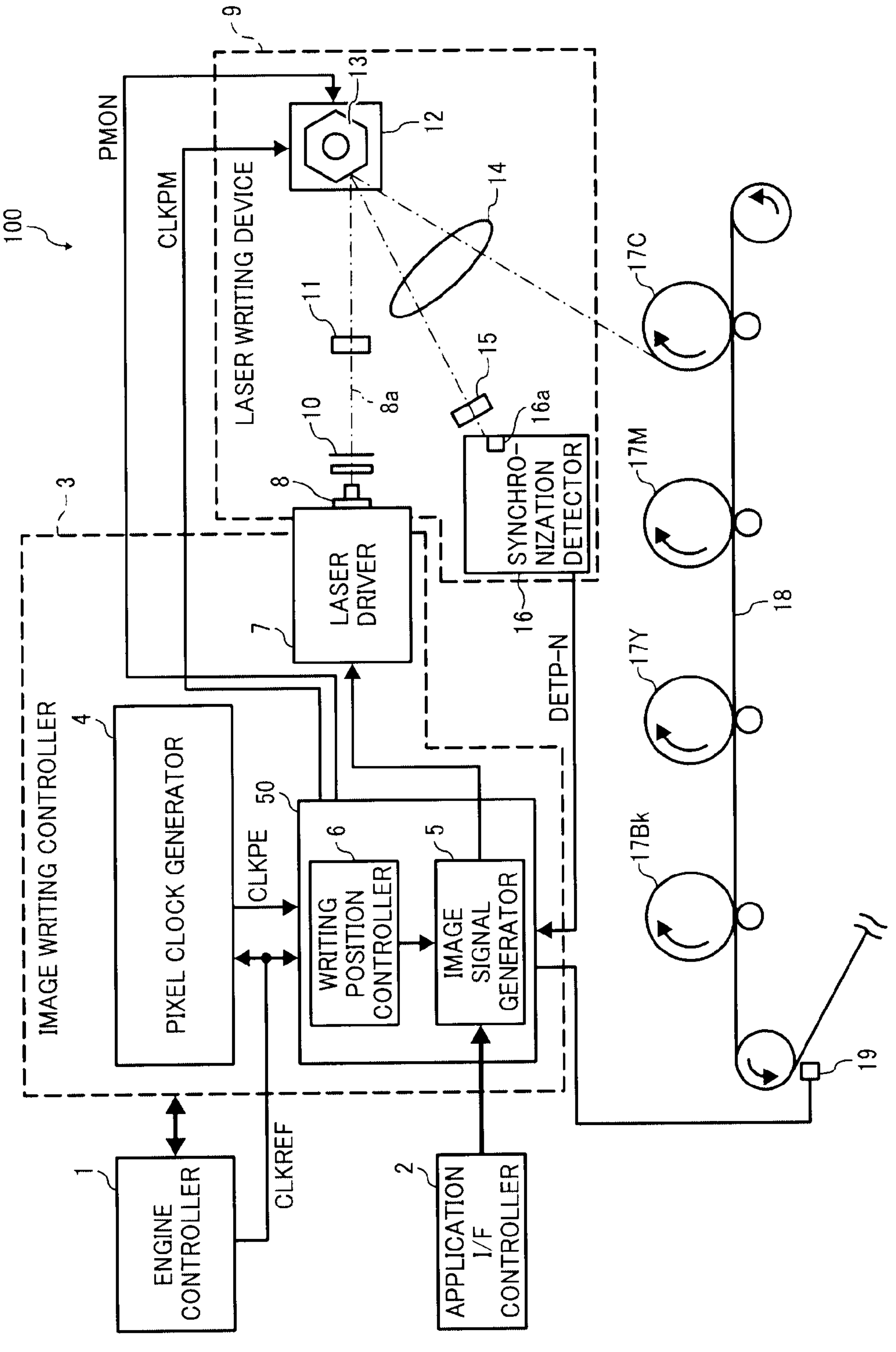
FIG. 1 is a block diagram showing a preferred embodiment of an image forming apparatus and an image forming method according to the present invention.

In describing preferred embodiments illustrated in the drawings, specific terminology is employed solely for the sake of clarity. It should be noted that the present invention is not limited to any preferred embodiment described in the drawings, and the disclosure of this patent specification is not intended to be limited to the specific terminology so selected. It is to be understood that each specific element includes all technical equivalents that operate in a similar manner and achieve a similar result.

Referring now to the drawings, wherein like reference numerals designate identical or corresponding parts throughout the several views, preferred embodiments of the present invention are described.

Referring to FIG. 1, a description is given of an image forming apparatus and an image forming method according to a preferred embodiment of the present invention.

FIG. 1 is a block diagram showing a preferred embodiment of an image forming apparatus 100 and an image forming method according to the present invention. The image forming apparatus 100 includes an engine controller 1, an application interface (I/F) controller 2, an image write controller 3, a picture element (pixel) clock generator 4, a writing signal controller 50, an image signal generator 5, a write position controller 6, a laser drive unit 7, a laser diode (LD) 8, a laser beam 8*a*, a laser write device 9, an aperture 10, a cylinder lens 11, a polygon motor drive unit 12, a polygon mirror 13, an fθ lens 14, a cylinder lens 15, a synchronization detector 16, a synchronization detection sensor 16*a*, photoconductor drums 17C, 17M, 17Y, and 17Bk, a transfer belt 18, and a toner mark (TM) sensor 19.

In the preferred embodiment, as an example of the image forming apparatus 100, a tandem-type full-color image forming apparatus is shown.

In FIG. 1, image data sent from an application apparatus (hereinafter, referred to as a superordinate apparatus), which is commonly known as a scanner, a facsimile, a personal computer (PC), and so forth, is input to the application I/F controller 2, subjected to image processing and so forth corresponding to each application apparatus, and output to the image write controller 3.

In the image write controller 3, the image data sent thereto is subjected to a series of image processing such as scaling processing, edge processing, image area control, and so forth, in the writing signal controller 50. Those processing are performed other than a scanning unit, a printer drive unit, or a facsimile control unit in the application I/F controller 2. The image data is converted into laser diode (LD) driving data such as Current Mode Logic (CML) or the like, and sent to the laser drive unit 7 to drive the LD 8. Thereby, in the laser write device 9, the laser beam 8*a* that is subjected to laser intensity modulation depending on image data of each color component in the image data (herein, image data of a cyan color component) is applied from the LD 8 onto the polygon mirror 13 of the polygon motor drive unit 12 through the aperture 10 and the cylinder lens 11.

At this moment, a reference clock CLKREF supplied from the engine controller 1 is used as a pixel clock CLKPE that is employed to transmit the image data to the laser write device 9 by clock synchronization. The reference clock CLKREF is supplied to the image write controller 3 as an oscillation source clock.

In the pixel clock generator 4, the pixel clock CLKPE is generated by dividing a frequency of the oscillation source clock, that is, a frequency of the reference clock CLKREF at a predetermined frequency division ratio that is determined by a register set value sent from the engine controller 1 or the like.

The engine controller 1 also supplies the reference clock CLKREF to the writing signal controller 50 in the image write controller 3. The writing signal controller 50 includes the image signal generator 5 and the writing position controller 6, and the reference clock CLKREF is input to both of the image signal generator 5 and the writing position controller 6. In the writing position controller 6, the frequency of the reference clock CLKREF is divided at a predetermined frequency division ratio that is determined by a register or the like, and a polygon clock CLKPM that controls a polygon motor, which is not shown, for rotationally driving the polygon mirror 13 in the polygon motor drive unit 12 is generated.

The laser beam 8*a* applied onto the polygon mirror 13 in the polygon motor drive unit 12 is deflected by rotation of the polygon mirror 13, and then is applied onto the photoconductor drum 17C for a cyan color through the fθ lens 14. At the same time, the laser beam 8*a* is applied to the synchronization detection sensor 16*a* of the synchronization detector 16 through the cylinder lens 15 when the deflection is started or ended, in other words, when a region out of an image area in a main scanning direction is irradiated with the laser beam 8*a*. When detecting the laser beam 8*a*, the synchronization detection sensor 16*a* generates and supplies a synchronization detection signal DETP-N to the image write controller 3. On the other hand, the polygon clock CLKPM and an ON/OFF signal PMON to drive the polygon motor are supplied to the polygon motor drive unit 12, and a polygon ready signal showing a lock state accompanied with rotation of the polygon mirror 13, which is not shown, is feed back to the image write controller 3 from the polygon motor drive unit 12.

It is commonly known that the aperture 10, the cylinder lens 11, the fθ lens 14, and the cylinder lens 15 are used in a laser write device in an image forming apparatus. Thus, a detailed description thereof is omitted herein.

As the polygon mirror 13 rotates, the laser beam 8*a* reflected at the polygon mirror 13 is irradiated onto a surface of the photoconductor drum 17C of cyan color while being deflected along a main direction in a rotation direction of the photoconductor drum 17C. Since the laser beam 8*a* is subjected to laser intensity modulation for the cyan color component of the image data, an electrostatic latent image of a cyan color image of the image data is formed on the surface of the photoconductor drum 17C as the photoconductor drum 17C of cyan color is rotationally driven.

In a tandem-type full-color image forming apparatus such as a full-color laser printer, a digital full-color copier, a digital composite apparatus, and so forth, the photoconductor drum 17C of cyan color, the photoconductor drum 17M of magenta color, the photoconductor drum 17Y of yellow color, and photoconductor drum 17Bk of black color are provided along the transfer belt 18. Laser beams subjected to laser intensity modulation for magenta, yellow, and black color components of the image data are applied onto surfaces of the photoconductor drums 17M, 17Y, and 17Bk while being deflected, respectively, and electrostatic latent images of magenta color, yellow color, and black color images of the image data are formed on the surface of the photoconductor drums 17M, 17Y, and 17Bk, respectively. A further description thereof is omitted herein.

A neutralization device, a charging device, and so forth are provided around the photoconductor drums 17C, 17M, 17Y, and 17Bk of respective cyan, magenta, yellow, and black colors (hereinafter, the photoconductor drums 17C, 17M, 17Y, and 17Bk are referred to as the photoconductor drum 17). The neutralization device, the charging device, and so forth are commonly known devices used in a conventional tandem-type full-color image forming apparatus. Therefore, they are not shown, and a detailed explanation thereof is omitted herein.

Each color electrostatic latent image on each photoconductor drum is transferred onto the transfer belt 18 and becomes each color visible image. Then, after the visible images is transferred and fixed onto a sheet of paper, sequential full-color image formation is completed.

The toner mark (TM) sensor 19 is a sensor used for positioning each color image in full-color image formation. A position of each color image is controlled by using output feedback of the toner mark (TM) sensor 19.

The above description is a schematic operation of a tandem-type full-color image forming apparatus.

Figure 2:
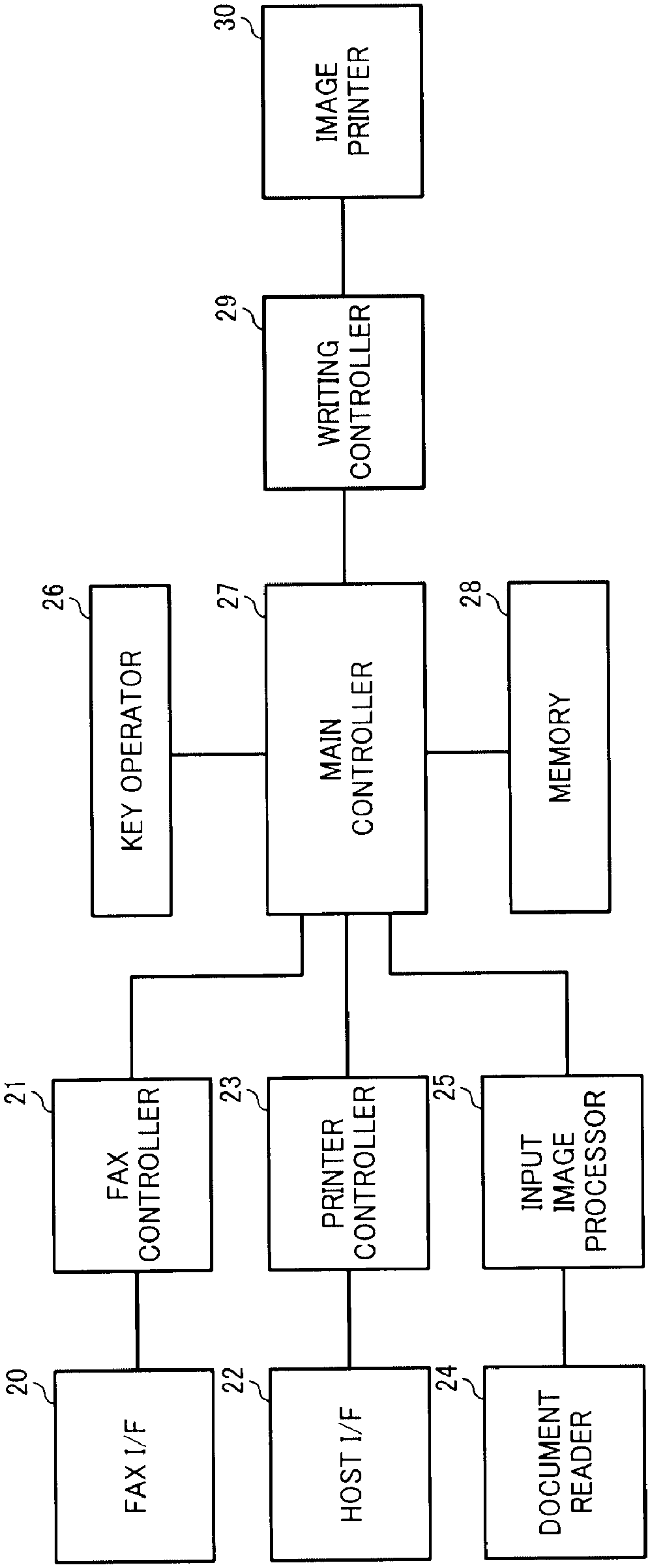
FIG. 2 is a block diagram schematically showing a control system of the preferred embodiment shown in FIG. 1.

FIG. 2 is a block diagram schematically showing a control system of the preferred embodiment shown in FIG. 1. The control system includes a FAX I/F 20, a FAX controller 21, a host I/F 22, a printer controller 23, a document reader 24, an input image processor 25, a key operator 26, a main controller 27, a memory 28, a write controller 29, and an image printer 30.

In FIG. 2, the FAX I/F 20 is an interface of a FAX application and passes FAX transmit/receive data. The FAX controller 21 processes the FAX transmit/receive data from the FAX I/F 20 corresponding to a communication specification of each FAX.

The host I/F 22 is an interface for transmitting and receiving image data from a host or a network. The printer controller 23 processes data sent from the host I/F 22 with a controller.

The document reader 24 reads a document put on a document table or an auto document feeder (ADF). The input image processor 25 processes the document read by the document reader 24.

The key operator 26 includes a variety of keys for selecting or setting an application, the number of sheets to be printed, a sheet size, enlargement or shrinkage, a user program, and a service program, canceling a variety of settings or set modes, and controlling an operation start or stop in the tandem-type full-color image forming apparatus 100 shown in FIG. 1. The main controller 27 entirely controls data transmission and receiving from each application in a main apparatus body of the image forming apparatus 100 and communicates with a control circuit for controlling each of peripheral applications such as a CPU, and performs timing control, a command I/F, and so forth. The memory 28 stores image data sent from the FAX controller 21, the printer controller 23, and the input image processor 25 for processing performed at the main controller 27.

The write controller 29 sets an image area of the image data sent from the main controller 27 depending on a transfer sheet size and performs LD modulation on the image data to send the image data to the engine controller 1 in the image forming apparatus 100. The image printer 30 prints and fixes an image onto a transfer sheet of paper by transferring the image through a photoconductor, an intermediate transfer belt, and so forth to output the image formed transfer sheet.

In the above-described configuration, the image forming apparatus 100 controls each member according to a signal from the key operator 26 and starts a print operation with an instruction signal from the main controller 27.

Each member shown in FIG. 1 and each function shown in FIG. 2 are explained by being related to each other.

The engine controller 1 in FIG. 1 corresponds to the main controller 27 in FIG. 2 and includes an interface function of the memory 28.

The application I/F controller (a scanner unit/a printer drive unit/a FAX control unit) 2 shown in FIG. 1 corresponds to the input image processor 25, the printer controller 23, and the FAX controller 21 shown in FIG. 2. The document reader 24, the host I/F 22, and the FAX I/F 20 shown in FIG. 2 correspond to blocks that are independent of each other and provided in the application I/F controller 2 shown in FIG. 1.

The image write controller 3 including the pixel clock generator 4, the writing signal controller 50, and the laser drive unit 7 shown in FIG. 1 corresponds to the write controller 29 shown in FIG. 2.

The laser write device 9 including the polygon motor drive unit 12, the polygon mirror 13, and the synchronization detector 16, the photoconductor drum 17, the transfer belt 18, and the toner mark sensor 19 shown in FIG. 1 correspond to the image printer 30 shown in FIG. 2.

Setting information determined by operating the key operator 26 shown in FIG. 2 is processed in the engine controller 1 shown in FIG. 1 and is used for controlling the application I/F controller (the scanner unit/the printer drive unit/the FAX control unit) 2, the image write controller 3, the laser write device 9, the photoconductor drum 17, the transfer belt 18, and so forth.

Figure 3:
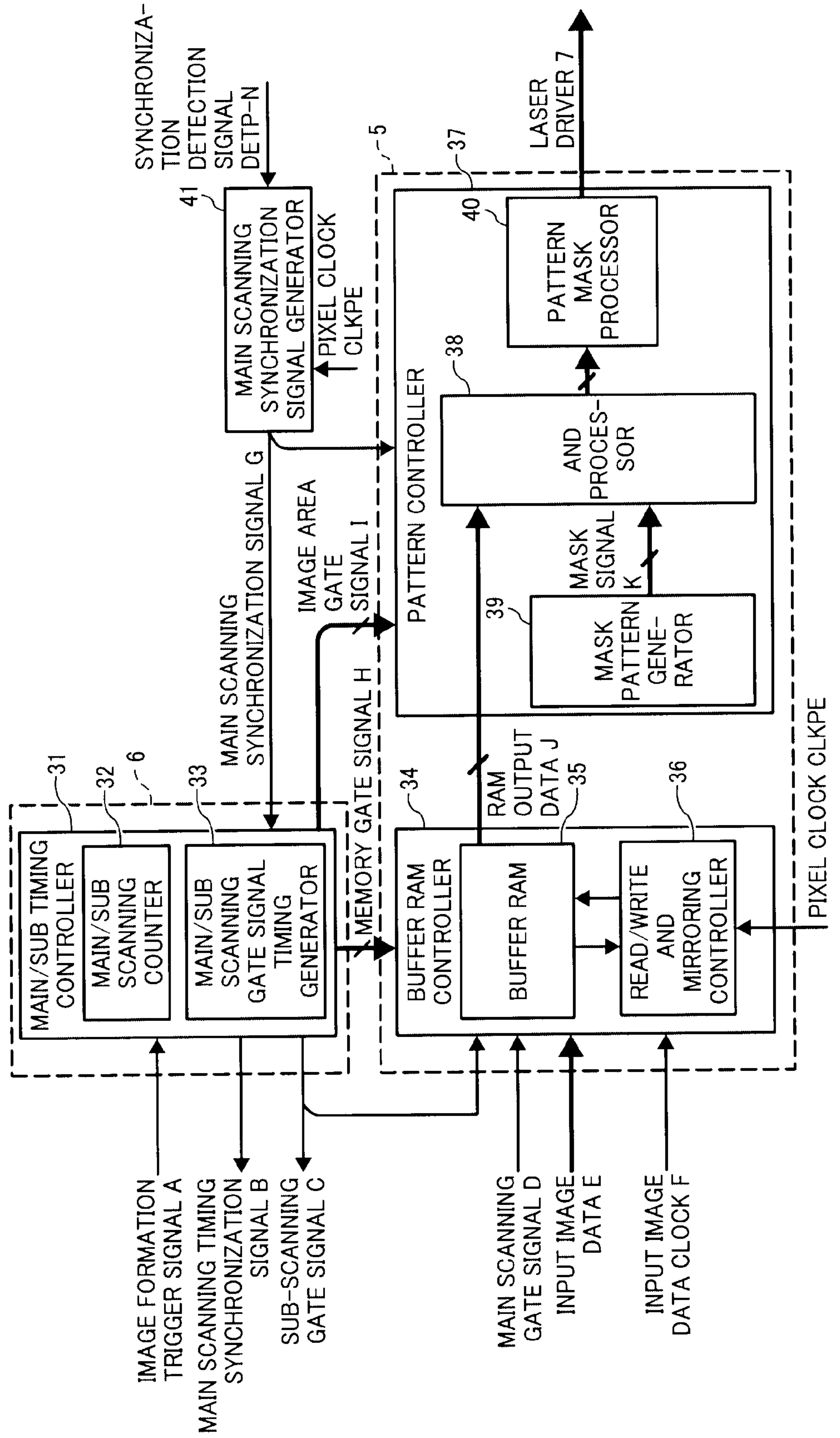
FIG. 3 is a block diagram showing an example configuration of an image write controller, more specifically, an example configuration of an image signal generator and a write position controller.

FIG. 3 is a block diagram showing an example configuration of the image write controller 3, more specifically, of the writing signal controller 50. The write position controller 6 includes a main/sub timing controller 31, a main/sub scanning counter 32, and a main/sub scanning gate signal timing generator 33. The image signal generator 5 includes a buffer PAM controller 34, a buffer RAM 35, a read/write and mirroring controller 36, a pattern controller 37, an AND processor 38, a mask pattern generator 39, a pattern mask processor 40. The image write controller 3 also includes a main scanning synchronization signal generator 41. Members and signals shown in FIG. 3 corresponding to the members and signals shown in FIG. 1 are referred to as the same reference numerals as in FIG. 1.

Figure 4:
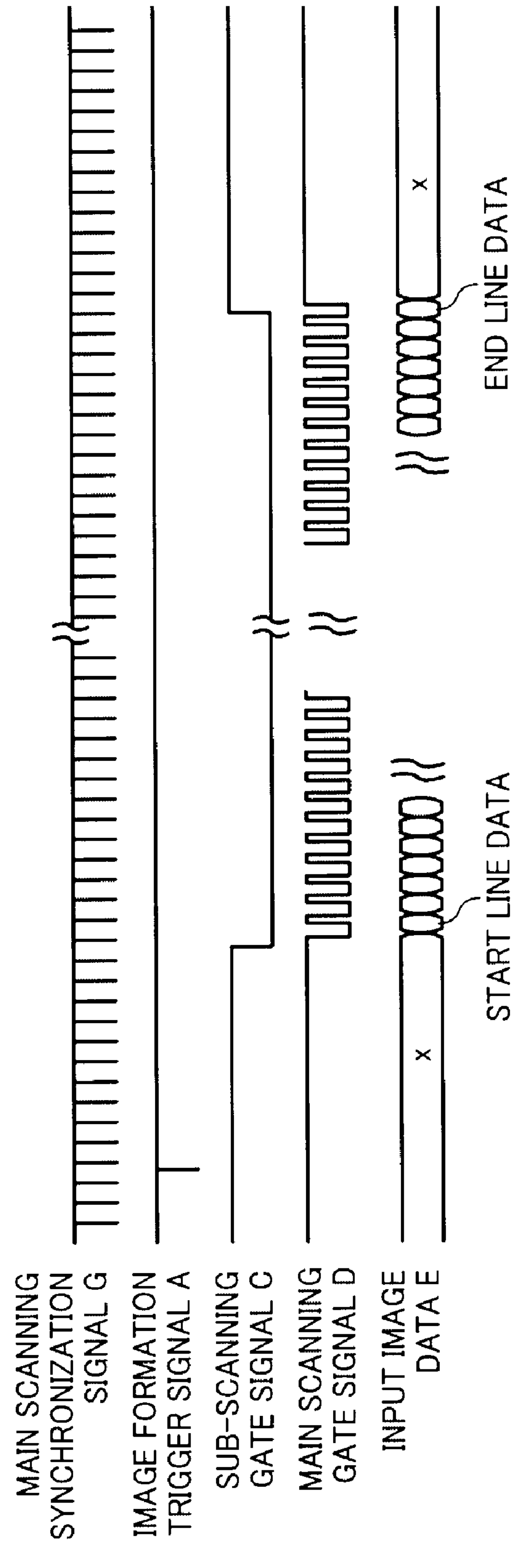
FIG. 4 is a diagram showing an example pulse waveform of each signal output from each unit in the example configuration shown in FIG. 3 to acquire input image data of a sub-scanning direction from a superordinate device.

FIG. 4 is a diagram showing an example pulse waveform of each signal output from each unit in the example configuration shown in FIG. 3 to acquire input image data of the sub-scanning direction from a superordinate device.

When the superordinate device is specified by operating the key operator 26 shown in FIG. 2, the superordinate device supplies an image formation trigger signal A as a trigger for image formation to the main/sub timing controller 31 in the write position controller 6 at an arbitrary time as shown in FIG. 4.

On the other hand, the main scanning synchronization signal generator 41 generates a main scanning synchronization signal G by synchronizing the pixel clock CLKPE with the synchronization detection signal DETP-N output from the synchronization detector 16 when the synchronization detection sensor 16*a* shown in FIG. 1 detects the laser beam 8*a*.

Then, the main scanning synchronization signal generator 41 supplies the main scanning synchronization signal G to the main/sub timing controller 31 in the write position controller 6 and to the pattern controller 37, as well.

When the superordinate device supplies the image formation trigger signal A while the main scanning synchronization signal generator 41 supplies the main scanning synchronization signal G, the main/sub timing controller 31 in the write position controller 6 generates and supplies a sub-scanning gate signal C to the superordinate device and the buffer RAM controller 34 to control sub-scanning timing.

After the sub-scanning gate signal C is asserted from high to low, the main/sub timing controller 31 outputs a main scanning timing synchronization signal B so that the superordinate device sends image data to the superordinate device. The main scanning timing synchronization signal B is a pulse signal having the almost same period as the main scanning synchronization signal G but having a different phase from the main scanning synchronization signal G. While the main scanning synchronization signal G is input to the main/sub timing controller 31, the main/sub timing controller 31 continuously outputs the main scanning timing synchronization signal B irrespective of presence or absence of image data transmission from the superordinate device.

After the sub-scanning gate signal C is asserted from high to low, a main scanning signal D output from the superordinate device is asserted from high to low. While the main scanning signal D is asserted, image data E corresponding to each color is supplied to the buffer RAM controller 34 from the superordinate device in synchronization with an input image data clock F that corresponds to each color. The image data E is input in units of lines. The main scanning signal D is repeatedly asserted. Each time the main scanning signal D is asserted, one line of the input image data E is input to the buffer RAM controller 34.

Next, each element shown in FIG. 3 is explained in detail.

In order to perform the above-described processing, the main/sub timing controller 31 generates the main scanning timing synchronization signal B and the sub-scanning gate signal C by using a main scanning counter and a sub-scanning counter in the main/sub scanning counter 32. The main scanning counter is a 14-bit counter by assuming that an effective scanning rate is approximately 0.3 to 0.6 when an A4 sheet size is 210 mm. The sub-scanning counter is a 14-bit counter and can scan an area of approximately 1.36 m when an A4 sheet size is 210 mm. The main scanning counter controls timing with respect to data in an image area.

The main/sub scanning counter 32 controls each counter by counting the pixel clock CLKPE in synchronization with the main scanning synchronization signal G. The main/sub timing controller 31 outputs a memory gate signal H in a main/sub scanning direction to the buffer RAM controller 34 and an image area gate signal I to the pattern controller 37, respectively, to control areas of a variety of patterns.

The input image data E is input to the buffer RAM controller 34 in synchronization with the input image data clock F corresponding to each color while the main scanning signal D is asserted. The sub-scanning gate signal C is also input to the buffer RAM controller 34 from the main/sub timing controller 31 to control sub-scanning timing.

In the preferred embodiment, the buffer RAM 35 is employed as a memory to perform velocity conversion on the input image data E, that is, convert synchronization of the input image data E with the input image data clock F into synchronization thereof with the pixel clock CLKPE. The buffer RAM 35 is formed of eight RAMs of 5120×4 bits.

The read/write and mirroring controller 36 controls reading and writing operations performed by the buffer RAM 35, a switching operation of the input image data according to each color, and mirroring in an optical system in which the laser beam 8*a* of each color is irradiated onto a reflection plane of the polygon mirror 13 shown in FIG. 1. The input image data of each color of yellow, magenta, cyan, and black is not output as four data flows corresponding to each color processing block in the pattern controller 37. The image data of each color is output as one data flow, and the read/write and mirroring controller 36 switches the four colors to send the image data of each color as one data flow in the switching operation.

By using the above-described configuration and operation, the input image data E is input to the buffer RAM controller 34 in synchronization with the input image data clock F, and the output image data of each color is output to the pattern controller 37 as RAM output data J in synchronization with the pixel clock CLKPE.

In the pattern controller 37, the mask pattern generator 39 generates a variety of geometrical patterns such as a vertical pattern, a horizontal pattern, a diagonal pattern, a lattice pattern, and so forth, a gradation pattern in a gray scale, a trim pattern showing an outlined area outside an image area, a P sensor pattern as a process pattern, and so forth, by performing logical operations on the main scanning counter output (14 bits) and the sub-scanning counter output (14 bits) that are generated by the main/sub timing controller 31. One of the variety of patterns generated by using the counter output is arbitrarily selected by a selector employed as a register by a CPU or the like in the engine controller 1 shown in FIG. 1 and is sent to the AND processor 38 as a mask signal K including a mask pattern and so forth. Then, logical AND is carried out between the mask signal K and the output image data of each color, that is, RAM output data J, output from the buffer RAM controller 34, and the image data subjected to the mask processing is sent to the pattern mask processor 40.

In the pattern mask processor 40, the image data subjected to the mask processing is subjected to further processing such as gamma conversion processing, edge processing that is applied to a binary/multiple-valued image, forced laser illumination/extinction processing, and so forth, corresponding to characteristics of the photoconductor drum 17 shown in FIG. 1. Then, the image data is sent to an LD modulation circuit of the laser drive unit 7.

In general, as for an area setting of each pattern, a main/sub scanning area is set by a predetermined register.

Figures 5A, 5B:
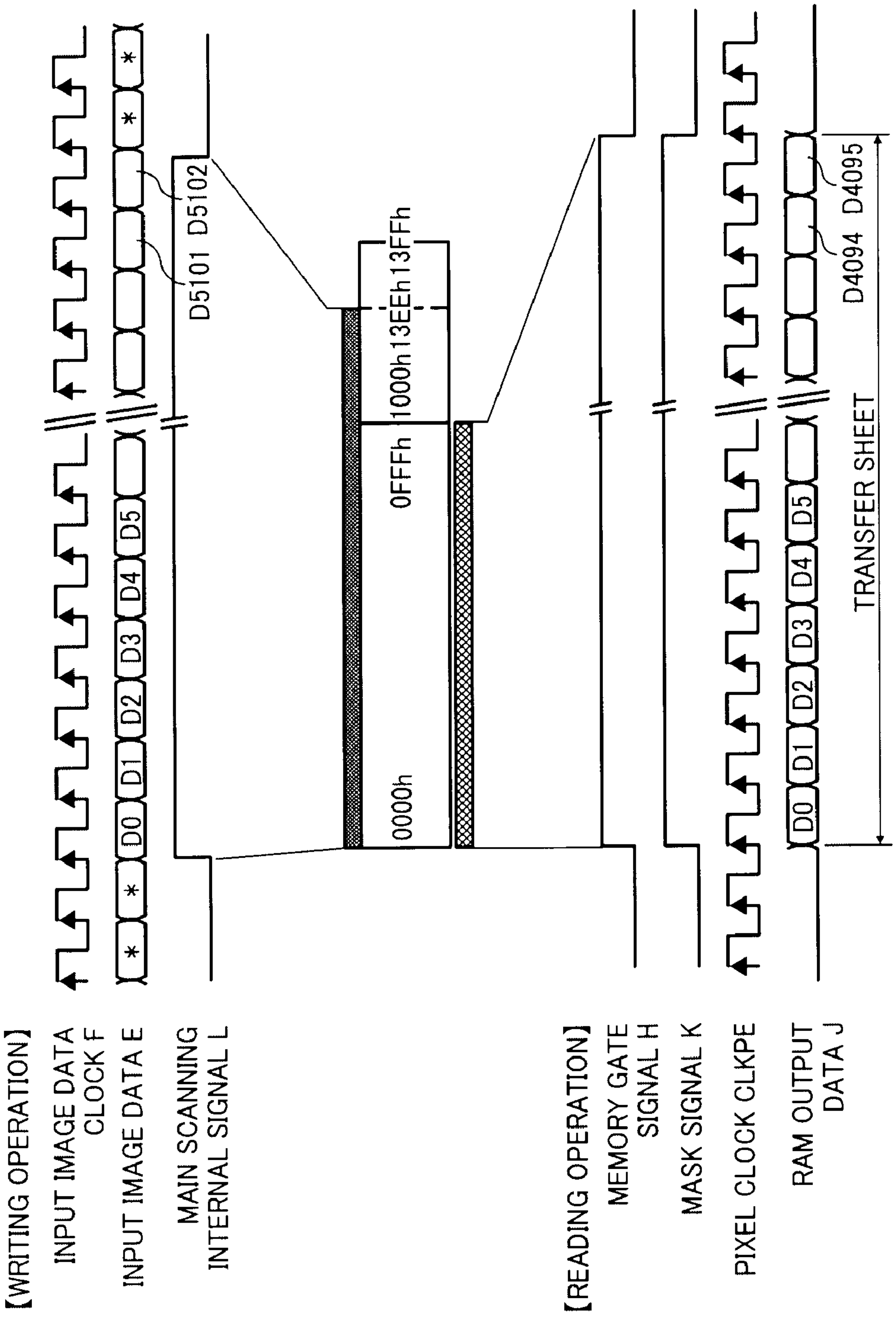
FIGS. 5A and 5B are diagrams showing an example pulse waveform of each signal used for a writing operation to and a reading operation from a buffer RAM 35, respectively, in a main scanning direction performed in the example configuration shown FIG. 3.

FIGS. 5A and 5B are diagrams showing an example pulse waveform of each signal used for a writing operation to and a reading operation from the buffer PAM 35, respectively, in the main scanning direction performed in the example configuration shown FIG. 3.

In FIG. 5A, an amount of one main scanning region of the input image data E is input and written to the buffer RAM 35 in synchronization with a rising edge of the input image data clock F during an active (high-level) period of a main scanning internal signal L. The active period of the main scanning internal signal L corresponds to the assert period of the main scanning gate signal D to input each line of the input image data E to the buffer RAM controller 34 as shown in FIG. 4.

On the other hand, as shown in FIG. 5B, an amount of one main scanning region on a transfer sheet of the input image data E is read from the buffer RAM 35 and is output to the pattern controller 37 as the RAM output data J in synchronization with a rising edge of the pixel clock CLKPE during assert periods of the memory gate signal H and the mask signal K. As for the sub-scanning direction, the memory gate signal H and the mask signal K are repeatedly asserted with respect to each amount of one main scanning region in synchronization with the main scanning synchronization signal G during an assert period of the sub-scanning gate signal C. An amount of one sub-scanning region of the input image data E is read from the buffer RAM 35 during the assert periods of the memory gate signal H and the mask signal K.

In FIG. 5, each 5103 pixels of the input image data E is written into (13EEh+1) addresses from “0h” to “13EEh” of the buffer RAM 35 with respect to each amount of one main scanning region. On the other hand, each 4096 pixels of the input image data E written in (0FFFh+1) addresses from “0h” to “0FFFh” of the buffer RAM 35 is read from the buffer RAM 35 with respect to each amount of one main scanning region. The number of written and read pixels of the input image data E is determined by the main scanning gate signal D and the main gate signal H. The number of read pixels of the input image data E can be arbitrarily set as long as being smaller than the number of written pixels of the image data.

With reference to FIGS. 6A, 6B, 6C and 6D, mask processing of image data performed by the pattern controller 37 shown in FIG. 3 is next described.

Figure 6A:
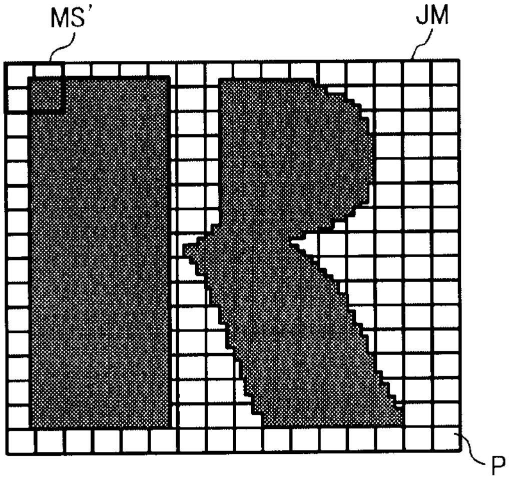
FIGS. 6A, 6B, 6C and 6D are illustrations showing mask processing of image data by a pattern controller shown in FIG. 3.

FIG. 6A shows matrix data JM formed of (64 rows)×(64 columns) that is obtained by expanding a part of the RAM output data J to a matrix having a plurality of rows and columns. A part of an image of the RAM output data J is a letter “R,” and the part of the image is expanded to the matrix data JM of (64 rows)×(64 columns). In other words, the matrix data JM of the (64 rows)×(64 columns) shown in FIG. 6A is an area of (64 lines)×(64 pixels) of the input image data E written into and read from the buffer RAM 35. One square is formed of (4 lines)×(4 pixels), that is, (4 rows)×(4 columns), and the one square is referred to as a unit pixel area P. The unit pixel area P is a minimum unit in masking the matrix data JM.

When data of one pixel is formed of one dot, the matrix data JM is formed of (64 dots)×(64 dots). However, it should be noted that the number of dots included in one pixel is different depending on an image data format of a superordinate apparatus such as a printer controller, a facsimile, a scanner, or the like, connected to the image forming apparatus 100, and the number of dots of the matrix data JM is different according to a image data format of the superordinate apparatus. Hereafter, more description about the mask processing is given with the matrix data JM of (64 dots)×(64 dots).

Figure 6B:
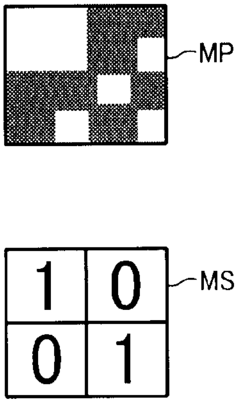

FIG. 6B shows a mask pattern MP to mask the matrix data JM expanded from the RAM output data J and a mask selector MS that is a selector to select whether the matrix data JM is masked with or without the mask pattern MP. By repeatedly applying the mask pattern MP and the mask selector MS to the matrix data JM, the mask processing thereof is completed.

Figure 7A:
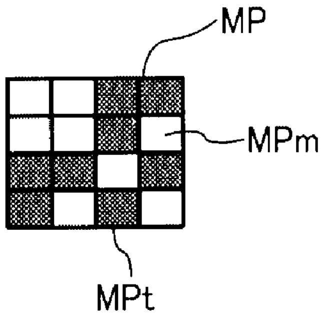
FIGS. 7A and 7B are enlarged illustrations of a mask pattern MP and a mask selector MS, respectively, shown in FIG. 6B.

FIG. 7A shows an enlarged illustration of the mask pattern MP. The mask pattern MP is a pattern formed of a square of (4 rows)×(4 columns) equivalent to a size of the unit pixel area P. One square of the mask pattern MP is applied to the unit pixel area P of the matrix data JM shown in FIG. 6A. At this point, as data of one pixel is formed of one dot as described above, the mask pattern MP is formed of (4 dots)×(4 dots).

Normally, a matrix size of the mask pattern MP is determined by dividing a matrix size of the matrix data JM, that is, (64 rows)×(64 columns), by an even number, in other words, multiplying the matrix size of the matrix data JM by ½N, hereat a number N is a natural number. The mask pattern MP shown in FIG. 7A has a matrix size obtained by multiplying the matrix size of the matrix data JM by 1⁄16, that is, the number N is 8.

In FIG. 7A, an area formed of one pixel (one dot) filled with white in the mask pattern MP is a unit mask area MPm to mask the one-pixel data of the matrix data JM. An area formed of one pixel (one dot) filled with black in the mask pattern MP is a unit through area MPt to output the one-pixel data of the matrix data JM as is.

In FIG. 6A, one-pixel data of the matrix data JM filled with black is represented by a value of “1,” and one-pixel data of the matrix data JM filled with white is represented by a value of “0.” On the mask pattern MP shown in FIG. 7A, the unit mask area MPm filled with white is represented by a value of “1,” and the unit through area MPt filled with black is represented by a value of “0.”

The AND processor 38 shown in FIG. 3 carries out logical AND between the unit pixel area P of the matrix data JM and the mask pattern MP in units of pixels. Before carrying out the logical AND, the AND processor 38 inverts each value of the unit mask areas MPm and the unit through areas MPt, that is, inverts “1” to “0” or “0” to “1.” Then, the AND processor 38 performs logical AND between the unit pixel area P of the matrix data JM and the mask pattern MP with the inverted values in units of pixels. For example, when carrying out logical AND between the one-pixel data of the unit pixel area P filled with black (=“1”) and the unit through area MPt of the mask pattern M filled with black (=“0”), “1” AND the inverted “0” results in “1” as a value of a masked dot (pixel) of the one-pixel data of the unit pixel area P. Namely, after masking, the color of the masked dot of the one-pixel data is still black. When carrying out logical AND between the one-pixel data of the unit pixel area P filled with black (=“1”) and the unit mask area MPm of the mask pattern M filled with white (=“1”), “1” AND the inverted “1” results in “0,” that is, the color of the masked dot of the one-pixel data is changed from black to white.

Figure 7B:
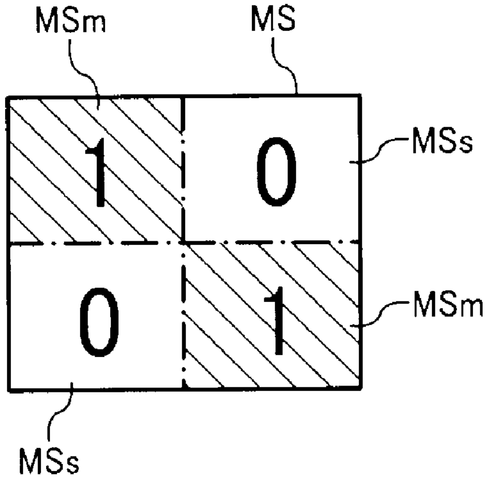

FIG. 7B shows an enlarged illustration of the mask selector MS. A unit area of the mask selector MS has the same matrix size as the mask pattern MP, that is, a size of (4 rows)×(4 columns). Normally, a matrix size of the mask selector MS is determined by multiplying the matrix size of the mask pattern MP by an even number, 2M. Hereat, a number M is a natural number and smaller than the number N (M<N). The mask selector MS shown in FIG. 7B has a matrix size of (8 rows)×(8 columns), that is, (8 dots)×(8 dots). The matrix size of the mask selector MS is obtained by multiplying the matrix size of the mask pattern MP by 2, that is, the number M is 1, since the matrix size of the mask pattern MP is (4 rows)×(4 columns), that is, (4 dots)×(4 dots).

The mask selector MS selects whether masking the unit pixel area P of the matrix data JM with the mask pattern MP, that is, carrying out logical AND between the unit pixel area P of the matrix data JM and the mask pattern MP in units of pixels, or masking all the unit pixel area P of the matrix data JM irrespective of the mask pattern MP with respect to each unit area of the mask selector MS. The unit area of the mask selector MS that masks the unit pixel area P of the matrix data JM with or without the mask pattern MP is referred to as a mask pattern selection area MSs or a mask area MSm, respectively.

On the mask selector MS shown in FIG. 7B, the mask area MSm is represented by a value of “1,” and the mask pattern selection area MSs is represented by a value of “0.” On the mask area MSm of the value of “1,” a corresponding (4 dots)×(4 dots) area of the unit pixel area P of the matrix data JM is totally masked irrespective of the mask pattern MP. On the other hand, on the mask pattern selection area MSs of the value of "0," a corresponding (4 dots)×(4 dots) area of the unit pixel area P of the matrix data JM is masked with the mask pattern MP.

The matrix data JM formed of (64 dots)×(64 dots) shown in FIG. 6A is masked with respect to each unit pixel area P formed of (4 dots)×(4 dots), which is the same size as the mask pattern MP shown in FIG. 7A, by the mask selector MS formed of (8 dots)×(8 dots). The mask selector MS successively moves from a top left of the matrix data JM in a row direction, that is, in a horizontal direction, while masking four unit pixel areas P formed of (8 dots)×(8 dots) at one time.

An area of the matrix data JM having the same size as the mask selector MS, that is, (8 dots)×(8 dots), is represented by a mask application area MS'. The mask application area MS' is indicated with a bold line in FIG. 6A. The mask application area MS' includes four unit pixel areas P.

When completing masking two rows of the unit pixel areas P in the row direction, that is, (8 dots)×(64 dots) the mask selector MS repeats masking next two rows of the unit pixel areas P in the row direction in the same manner, that is, moves from third and fourth unit pixel areas P from the top left in the row direction. When the mask selector MS completes masking last two rows of the unit pixel areas P, the matrix data JM is thoroughly masked.

More specifically, the mask selector MS thoroughly masks one of the unit pixel areas P in the mask application area MS' corresponding to the mask area MSm of the value of "1," and masks one of the unit pixel areas P in the mask application area MS' corresponding to the mask pattern selection area MSs of the value of "0" with the mask pattern MP.

Figure 6C:
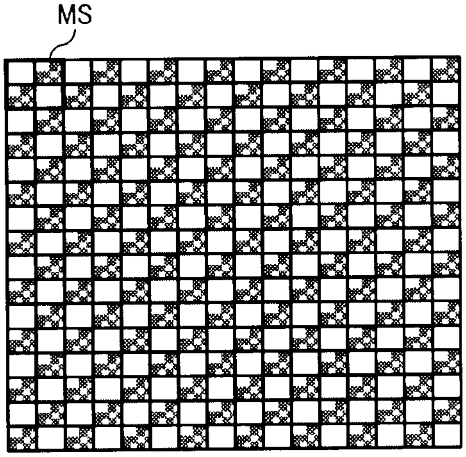

FIG. 6C shows a trace of the mask selector MS with the masking pattern MP on the matrix data JM. An area of the mask selector MS is indicated with a bold line. When the mask selector MS moves from the top left to the bottom right, a masking pattern of the size of (64 dots)×(64 dots) is shown in FIG. 6C.

Figure 6D:
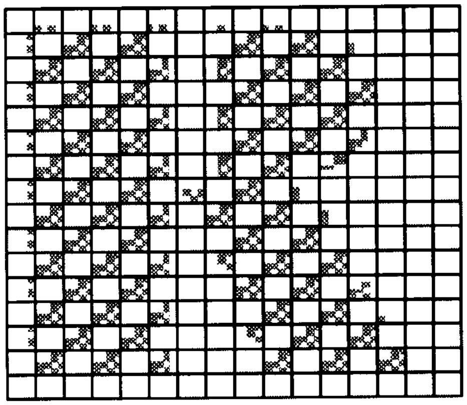

FIG. 6D shows an image obtained by masking the matrix data JM shown in FIG. 6A with the mask selector MS including the masking pattern MP as described above.

The above-described mask processing is performed in the AND processor 38 shown in FIG. 3. The AND processor 38 carries out logical AND between the matrix data JM as the part of the RAM output data J read from the buffer RAM 35 and the mask signal K, that is, the mask pattern MP and the mask selector MS shown in FIGS. 7A and 7B, respectively, output from the mask pattern generator 39.

Figure 10:
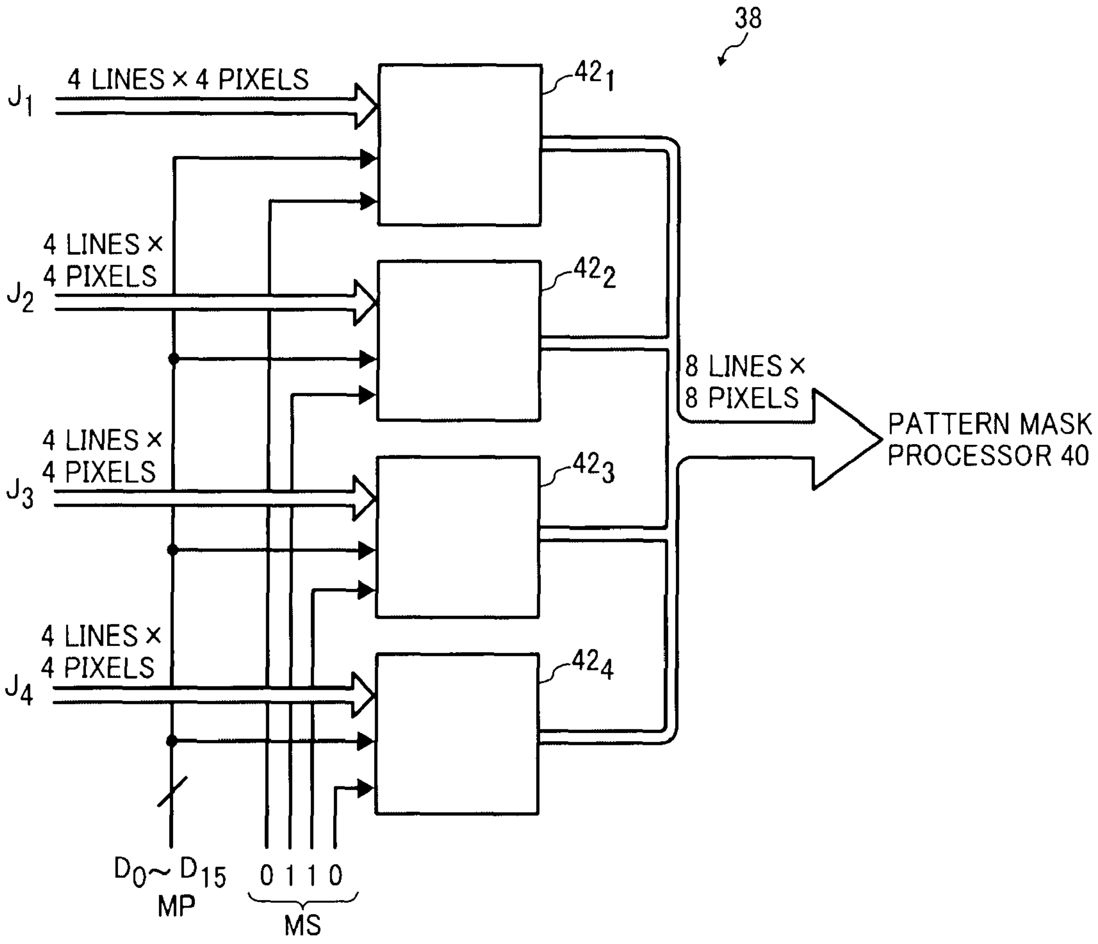
FIG. 10 is an example block diagram of an AND processor 38 shown in FIG. 3.

More specifically, the mask application area MS' of (8 dots)×(8 dots) is read to the AND processor 38 one by one. At AND gate circuits $\mathbf{42}_1$, $\mathbf{42}_2$, $\mathbf{42}_3$, and $\mathbf{42}_4$ of the AND processor 38, which is shown in FIG. 10, pixels included in the unit pixel area P of (4 dots)×(4 dots) of the mask application area MS' that is subjected to the mask area MSm of the mask selector MS is deleted, and pixels included in the unit pixel area P that is subjected to the mask pattern selection area MSs of the mask selector MS is masked by logical AND with the mask pattern MP.

Before carrying out the logical AND, the AND processor 38 inverts each value of the mask area MSm represented by "1" and the mask pattern selection area MSs represented by "0," as well as the AND processor 38 inverts each value of the mask pattern MP. Then, the AND processor 38 performs logical AND between the unit pixel area P of the matrix data JM and mask selector MS with the inverted values in units of unit pixel areas P. This processing is described in detail with reference to FIG. 10 below.

Figure 8A:
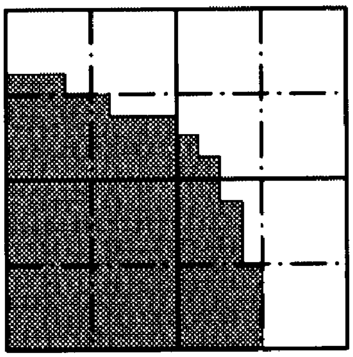
FIGS. 8A and 8B are enlarged illustrations of a part of matrix data JM shown in FIG. 6A and a part of masked image data shown in FIG. 6D.
Figure 8B:
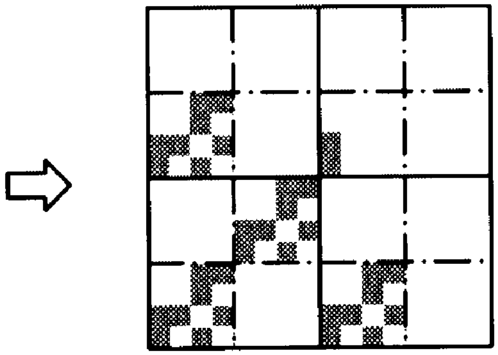

FIG. 8A shows a part of the matrix data JM that includes 16 unit pixel areas P of (4 dots)×(4 dots), that is, 4 mask application areas MS'. FIG. 8B shows masked image data obtained by masking the part of the matrix data JM using the mask selector MS with the mask pattern MP as described above.

Subsequently, the mask pattern MP and the mask selector MS is described in detail.

As described above, on the mask pattern MP shown in FIG. 7A, the unit mask area MPm filled with white is represented by the value of "1," and the unit through area MPt filled with black is represented by the value of "0." A left-to-right arrangement of the unit mask areas MPm and the unit through areas MPt in each line of the mask pattern MP is represented with a binary or hexadecimal numerical value as follows, in which white and black are represented as W and B, respectively:

First line: WWBB=1100b=Ch
Second line: WWBW=1101b=Dh
Third line: BBWB=0010b=2h
Fourth line: BWBW=0101b=5h When a value of a leftmost unit area in the first line, that is, a value of a top-left unit area of the mask pattern MP, is referred to as the most significant bit, and a value of a rightmost unit area in the fourth line, that is, a value of a bottom-right unit area of the mask pattern MP, is referred to as the least significant bit, the mask pattern MP shown in FIG. 7A is represented as a hexadecimal number of "CD25h." At this point, when the mask pattern MP is applied to the matrix data JM, each bit of the mask pattern MP is inverted before the logical AND in the AND processor 38, that is, "1" to "0" or "0" to "1." Thus, a hexadecimal number of the mask pattern MP after the inversion is "32DAh."

As described above, on the mask selector MS shown in FIG. 7B, the mask area MSm is represented by a value of "1," and the mask pattern selection area MSs is represented by a value of "0." When top-left, top-right, bottom-left, and bottom-right unit areas of the mask selector MS are referred to as the most, second most, second least, and least significant bits, respectively, the mask selector shown in FIG. 7B is represented as a binary number of "1001b" or a hexadecimal number of "9h." Similar to the mask pattern MP, each bit of the mask selector MS is inverted before the logical AND in the AND processor 38. Thus, a binary or hexadecimal number of the mask selector MS after the inversion is "0110b" or "6h."

The matrix data JM shown in FIG. 6A is masked by thinning out pixels using the mask selector MS including the mask pattern MP as described above and resulted in the masked image shown in FIG. 6D or 8B.

It should be noted that the mask pattern MP, the mask selector MS, and the mask processing that are described above can be applied to each color image, that is, cyan, magenta, yellow, or black.

Numerical values of the mask pattern MP and the mask selector MS in each color are set to a register in the mask pattern generator 39 of the pattern controller 37 shown in FIG. 3.

FIG. 9 shows an example format of the mask pattern MP and the mask selector MS in each color.

In FIG. 9, a register name to which the mask pattern MP or the mask selector MS is set is represented as MASKX or MASKENX, respectively. In these names, "X" is a number of 0, 1, 2, or 3 and represents each color of cyan, magenta, yellow, or black, respectively. MASK0 and MASKEN0 are registers of the mask pattern MP and the mask selector MS for a cyan color image, respectively. MASK1 and MASKEN1 are registers of the mask pattern MP and the mask selector MS for a magenta color image, respectively. MASK2 and MASKEN2 are registers of the mask pattern MP and the mask selector MS for a yellow color image, respectively. MASK3 and MASKEN3 are registers of the mask pattern MP and the mask selector MS for a black color image, respectively.

The registers MASKEN0, 1, 2, and 3 are 4-bit registers formed of bits D0, D1, D2, and D3. As shown in FIG. 9, in these registers, the least significant bit D0, the second least significant bit D1, the second most significant bit D2, and the most significant bit D3 are assigned to the bottom-right, bottom-left, top-right, and top-left unit areas of the mask selector MS, respectively.

The registers MASK0, 1, 2, and 3 are 16-bit registers formed of bits D0 through D15. As shown in FIG. 9, in these registers, the least significant bit D0 is assigned to the bottom-right pixel, and the most significant bit D15 is assigned to the top-left pixel. As a bit is closer to the top-left pixel, the bit number is higher.

In the format shown in FIG. 9, "masken0[3:0]" represents that valid data of the register MASKEN0 includes subordinate 4 bits of the bits D0, D1, D2, and D3. "Mask0[15:0]" represents that valid data of the register MASK0 includes 16 bits of the bits D0 through D15. The other registers MASKEN1, 2 and 3 and MASK1, 2 and 3 also have the same configurations as the register MASKEN0 and the register MASK0, respectively.

In a field of "contents" in FIG. 9 shows contents of information included in each registers MASKEN0, 1, 2, and 3 and registers MASK0, 1, 2, and 3. Default values of the registers MASKEN0, 1, 2, and 3 and the registers MASK0, 1, 2, and 3 are "0h" and "0000h," respectively.

FIG. 10 is an example block diagram of the AND processor 38 shown in FIG. 3.

The PAM output data J to be expanded to the matrix data JM shown in FIG. 6A is read from the buffer RAM 35 in units of the mask application areas MS', which is a 2 by 2 matrix of four unit pixel areas P. Then, the read original image data J is divided into image data $J_1$, $J_2$, $J_3$, and $J_4$, respectively, including one unit pixel area P to be sent to the AND processor 38.

The AND processor 38 includes the four AND gate circuits $42_1$, $42_2$, $42_3$, and $42_4$ as shown in FIG. 10. Each of the gate circuits $42_1$, $42_2$, $42_3$, and $42_4$ carries out the logical AND between the image data $J_1$, $J_2$, $J_3$, and $J_4$ and the mask selector MS and then the mask pattern MP. For example, the image data $J_1$ is sent to the AND gate circuit $42_1$ and each one-pixel data of the image data $J_1$ is subjected to the logical AND with the inverted most significant bit "0" of the mask selector MS, in which the mask selector MS is represented as "1001b." The image data $J_2$ is sent to the AND gate circuit $42_2$ and each one-pixel data of the image data $J_2$ is subjected to the logical AND with the inverted second most significant bit "1" of the mask selector MS. The image data $J_3$ is sent to the AND gate circuit $42_3$ and each one-pixel data of the image data $J_3$ is subjected to the logical AND with the inverted second least significant bit "1" of the mask selector MS. The image data $J_4$ is sent to the AND gate circuit $42_4$ and each one-pixel data of the image data $J_4$ is subjected to the logical AND with the inverted least significant bit "0" of the mask selector MS. Thereby, all the one-pixel data of the image data $J_1$ and $J_4$ is masked. Each one-pixel data of the image data $J_2$ and $J_3$ is further subjected to AND with the mask pattern MP. As a result, the image data $J_1$, $J_2$, $J_3$, and $J_4$ is thoroughly subjected to the mask processing.

In the AND gate circuits $42_1$, $42_2$, $42_3$, and $42_4$, an AND gate is provided with respect to each one-pixel data of the image data $J_1$, $J_2$, $J_3$, and $J_4$. Each one-pixel data and a bit of the mask selector MS and the mask pattern MP corresponding to each one-pixel data is sent to each AND gate such that each one-pixel data is masked or remains as is.

Image data output from the AND gate circuits $42_1$, $42_2$, $42_3$, and $42_4$ is sent to the pattern mask processor 40 shown in FIG. 3. The pattern mask processor 40 returns each one-pixel data of the output image data to an original arrangement position of the original image data J and further converts the output image data into consecutive data to send the consecutive data to the laser drive unit 7 shown in FIG. 1.

As described above, according to the preferred embodiment, matrix data smaller than original image data is generated, and each unit area of the matrix data is masked with a mask pattern or totally masked without the mask pattern, whereas a large area of original image data is masked by a conventional method. Since the original image data is masked successively and entirely, masking efficiency can be improved with a minimal configuration of the pattern controller 37. In addition, toner consumption can be reduced while eliminating image quality deterioration by masking image data using the above-described method.

In the preferred embodiment described above, the matrix size of the mask pattern MP is determined by dividing a matrix size of the matrix data JM by an even number. Alternatively, the matrix size of the mask pattern MP can be determined with an arbitrary number of rows and columns. On the other hand, the unit area of the mask selector MS is the same matrix size as the mask pattern MP, that is, 4 by 4. Alternatively, the unit area of the mask selector MS can be a matrix size of 3 by 3, 3 by 4, or 3 by 5.

It should be noted that the present invention does not limit logic of the masking or non-masking with the mask pattern MP and a logical operation thereof to the preferred embodiment. In the preferred embodiment, the logical operation is described with AND. Alternatively, other logical operations can be employed with an arbitrary combination, as long as the combination of other logical operations can optimally perform the mask processing.

The present invention describes a full-color tandem-type image forming apparatus and an image forming method used therein as the preferred embodiment. However, it should be noted that the present invention does not limit an image forming apparatus to the preferred embodiment. As long as an image forming apparatus includes a unit configured to expand input image data to matrix data formed of a plurality of rows and columns and a function to perform image formation by modulating the matrix data into an optical writing signal, other types of image forming apparatus can be employed.

It should be noted that the above-described embodiments are merely illustrative, and numerous additional modifications and variations are possible in light of the above teachings. For example, elements and/or features of different illustrative and preferred embodiments herein may be combined with each other and/or substituted for each other within the scope of this disclosure. It is therefore to be understood that the disclosure of this patent specification may be practiced otherwise than as specifically described herein.

What is claimed is:

1. An image forming apparatus, comprising:

an expansion unit configured to expand image data input to the image forming apparatus to first matrix data formed of a plurality of rows and columns;

a first mask unit configured to mask the first matrix data by performing a logical operation on the first matrix data and on a mask pattern that is second matrix data formed of a plurality of rows and columns, the number of rows and columns of the second matrix data being smaller than a number of rows and columns of the first matrix data;

a second mask unit configured to select one of first processing, which completely masks a unit area of the first matrix data corresponding to one of a plurality of mask unit areas of third matrix data, and second processing, which masks the unit area of the first matrix data corresponding to the one of the plurality of mask unit areas of the third matrix data by using the first mask unit, the second mask unit selects one of the first processing and the second processing for each of the plurality of mask unit areas by using the third matrix data, the second matrix data corresponding in size to one of the plurality of mask unit areas of the third matrix data, and each of the plurality of mask unit areas of the third matrix data being formed of the same number of rows and columns as the second matrix data; and an image formation unit configured to form an image by modulating the first matrix data that is masked by the second mask unit into an optical writing signal, wherein the third matrix data, in which one of the first processing and the second processing selected by the second mask unit is assigned to each of the plurality of mask unit areas, is successively moved over an entire area of the first matrix data in units of the third matrix data to mask the first matrix data.

2. The image forming apparatus according to claim 1, wherein:

the second matrix data that functions as the mask pattern is formed of an arbitrary number of rows and columns of a predetermined ratio with respect to the number of rows and columns of the first matrix data.

3. The image forming apparatus according to claim 2, wherein:

the third matrix data that functions as the second mask unit is formed of a plurality of rows and columns whose number is obtained by multiplying the arbitrary number by 2M, where M is a natural number smaller than a number N that represents the predetermined ratio between the number of rows and columns of the first matrix data and the arbitrary number of rows and columns of the second matrix data.

4. The image forming apparatus according to claim 1, further comprising a setting unit configured to assign an arbitrary value to each of the second matrix data and the third matrix data.

5. The image forming apparatus according to claim 1, further comprising a setting unit configured to assign values to the second matrix data and the third matrix data, the values corresponding to a plurality of colors of the image data.

6. The image forming apparatus according to claim 1, wherein the second mask unit selects the first processing for a first of the plurality of mask unit areas of the third matrix data and selects the second processing for a second of the plurality of mask unit areas of the third matrix data.

7. The image forming apparatus according to claim 1, wherein both the first mask unit and the second mask unit mask the first matrix data successively and entirely.

8. The image forming apparatus according to claim 1, wherein the first processing and the second processing are different.

9. An image forming method, comprising the steps of:

expanding image data input to an image forming apparatus to first matrix data formed of a plurality of rows and columns;

masking the first matrix data by performing a logical operation on the first matrix data and on second matrix data that is formed of a plurality of rows and columns, in which the number of rows and columns of the second matrix data is smaller than the number of rows and columns of the first matrix data;

masking completely a unit area of the first matrix data corresponding to a mask unit area third matrix data, in which the mask unit area is formed of the same number of rows and columns as the second matrix data;

selecting one of the step of masking completely the unit area of the first matrix data corresponding to the mask unit area of the third matrix data, and the step of masking a unit area of the first matrix data corresponding to the mask unit area by using the second matrix data, the selecting being performed for each mask unit area by using the third matrix data that includes a plurality of mask unit areas, the second matrix data corresponding in size to one of the plurality of mask unit areas of the third matrix data;

forming an image by modulating the first matrix data that is masked by the third matrix data into an optical writing signal; and successively moving the third matrix data over an entire area of the first matrix data in units of the third matrix data to mask the first matrix data.

10. The image forming method according to claim 9, wherein:

the second matrix data is formed of an arbitrary number of rows and columns of a predetermined ratio with respect to the number of rows and columns of the first matrix data.

11. The image forming method according to claim 10, wherein:

the third matrix data is formed of a plurality of rows and columns whose number is obtained by multiplying the arbitrary number by 2M, wherein M is a natural number smaller than a number N that represents the predetermined ratio between the number of rows and columns of the first matrix data and the arbitrary number of rows and columns of the second matrix data.

12. The image forming method according to claim 9, further comprising the step of assigning an arbitrary value to each of the second matrix data and the third matrix data.

* * * * *